United States Patent
Leimgruber et al.

[15] 3,700,679

[45] Oct. 24, 1972

[54] NUCLEAR SUBSTITUTED DERIVATIVES OF 1-HYDROXY-6-METHOXYPHENAZINE 5,10-DIOXIDE

[72] Inventors: Willy Leimgruber, Montclair; Manfred Weigele, North Caldwell, both of N.J.

[73] Assignee: Hoffmann-La Roche Inc., Nutley, N.J.

[22] Filed: June 8, 1970

[21] Appl. No.: 44,555

[52] U.S. Cl. ......260/267, 260/247.2 A, 260/247.2 B, 260/247.5 B, 424/248, 424/250
[51] Int. Cl. ..............................................C07d 51/80
[58] Field of Search ........260/267, 247.5 B, 247.2 A, 260/247.2 B

[56] References Cited

UNITED STATES PATENTS

| 3,502,774 | 3/1970 | Grunberg | 424/250 |
| 3,080,283 | 3/1963 | Bijloo et al. | 260/267 |
| 3,567,728 | 3/1971 | Johnston et al | 260/267 |

*Primary Examiner*—Alex Mazel
*Assistant Examiner*—Anne Marie T. Tighe
*Attorney*—Samuel L. Welt, Bernard S. Leon, Gerald S. Rosen, R. Hain Swope, William M. Farley, Margaret C. Bogosian and Jon S. Saxe

[57] ABSTRACT

Nuclear substituted derivatives of 1-hydroxy-6-methoxyphenazine 5,10-dioxide which possess broad spectrum antimicrobial activity are disclosed.

5 Claims, No Drawings

NUCLEAR SUBSTITUTED DERIVATIVES OF 1-HYDROXY-6-METHOXYPHENAZINE 5,10-DIOXIDE

DESCRIPTION OF THE INVENTION

This invention relates to novel nuclear substituted derivatives of 1-hydroxy-6-methoxyphenazine 5,10-dioxide, the known antibiotic myxin, and to methods for their preparation. These novel derivatives exhibit broad spectrum anti-microbial activity.

The novel derivatives to which the invention relates are selected from the group consisting of compounds represented by the formula

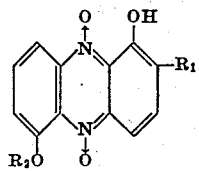

I wherein $R_1$ signifies bromine or the group —$CH_2Z$, wherein Z signifies a five or six membered heterocyclic ring containing a nitrogen atom and at most one further hetero atom consisting of oxygen; and $R_2$ signifies lower alkyl or the group

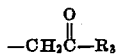

wherein $R_3$ signifies lower alkoxy, amino, mono-lower alkyl-amino, di-lower alkylamino, or hydroxy-lower alkylamino.

As used herein the term "lower alkyl" either alone or in combination denotes straight or branched chain saturated hydrocarbon groups containing from one to seven carbon atoms inclusive such as methyl, ethyl, propyl, isopropyl, butyl, pentyl, hexyl and the like, with groups containing from one to four carbon atoms being preferred. The term "lower alkoxy" designates straight or branched chain alkoxy groups containing from one to seven carbon atoms, preferably from one to four carbon atoms, such as methoxy, ethoxy, propoxy and the like.

In a preferred aspect, when $R_1$ signifies the group —$CH_2Z$, Z being defined as above, the heterocyclic ring is saturated and represents a member selected from the group consisting of morphilino, piperidino and pyrrolidino.

Representative of compounds of formula I are:
6-Methoxy-2-pyrrolidinylmethyl-1-phenazinol 5,10-dioxide;
2-Bromo-6-methoxy-1-phenazinol 5,10-dioxide;
7-Bromo-6-hydroxy-N-(2-hydroxyethyl)-1-phenazinoxyacetamide 5,10-dioxide; and
7-Bromo-6-hydroxy-1-phenazinoxyacetic acid 5,10-dioxide ethyl ester.

A preferred class of compounds falling within the scope of formula I are those wherein $R_1$ signifies bromine, i.e., compounds of the formula

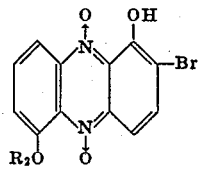

Ia wherein $R_2$ is as described above.
The compounds of formula Ia are preferred because of their interesting level of biological activity.

Another class of compounds preferred because of their interesting biological activity and falling within the scope of the present invention are those wherein $R_1$ signifies the group —$CH_2Z$, Z being defined as above, i.e., compounds of the formula

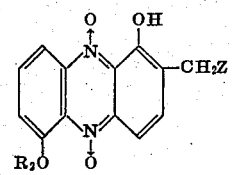

Ib wherein $R_2$ and Z are as described above.

Most preferred of the compounds of formula I are:
6-Methoxy-2-pyrrolidinylmethyl-1-phenazinol 5,10-dioxide; and
2-Bromo-6-methoxy-1-phenazinol 5,10-dioxide.

The compounds of formula I above may be prepared following a variety of procedures. The choice of procedure will depend upon the nature of the $R_1$ and $R_2$ substituents to be introduced into the phenazine molecule.

For example, the compounds of formula I above wherein $R_1$ signifies bromine can be prepared following any conveniently available bromination technique, such as treating myxin or an analogue or derivative thereof which is unsubstituted in the ortho position to the phenolic hydroxy group with bromine. For the purposes of this process aspect of the invention the bromination reaction is expediently effected in the presence of an inert organic solvent. Suitable solvents include aromatic hydrocarbons, such as benzene, toluene and the like and halogenated hydrocarbons such as chloroform, carbontetrachloride and the like.

In a further process aspect of the present invention, the novel compounds of formula I above wherein the $R_1$ substituent is the group —$CH_2Z$, Z being defined as above, may be prepared by reacting myxin or an analogue or derivative thereof unsubstituted in the ortho position to the phenolic hydroxy group with a saturated cyclic amine in the presence of formaldehyde. This reaction is expediently effected in the presence of an aprotic polar organic solvent such as hexamethyl phosphoric triamide (HMPT), di-methyl formamide (DMF) and di-methyl sulfoxide (DMSO), with HMPT being preferred. Representative cyclic amines that may be used in this process aspect include morpholine, piperidine, pyrrolidine and the like. Temperature and reaction time are not critical to this process's aspect. Thus, temperatures between about 10° C and about 70° C are suitable, with room temperature being preferred. Likewise, reaction times which permit completion of the reaction are employed, usually from about 1 to 24 hours.

1-hydroxy-6-methoxyphenazine 5,10-dioxide, the known antibiotic myxin, which is used as the starting material in several of the process aspects of the present invention, may be prepared following a variety of procedures. One such approach involves the methylation of 1,6-phenazinediol 5,10-dioxide, the known antibiotic iodinin. This methylation procedure is preferably carried out in two stages. In the first stage the starting material iodinin is converted to its mono alkali metal salt, preferably the potassium salt. The conversion of iodinin to its alkali metal salt is accomplished by reacting iodinin with an alkali metal base. This reaction is expediently effected in the presence of an aprotic organic solvent, such as HMPT, DMF and DMSO, with HMPT being preferred. Use of an aprotic organic solvent is preferred since this solvent can also be utilized in the methylation step, thus eliminating the necessity of first isolating the iodinin salt. Suitable alkali metal bases that may be used to form the iodinin salt include alkali metal lower alkoxides containing from one to four carbon atoms. Preferred alkali metal lower alkoxides include the sodium and potassium compounds, with potassium t-butoxide being the most preferred.

In the second stage of the methylation process, the mono alkali metal salt of iodinin is selectively methylated by reacting said compound with conventional methylating agents. As indicated above, this selective methylation of the mono alkali metal salt of iodinin is expediently effected in the presence of an aprotic polar organic solvent such as HMPT, DMF and DMSO, with HMPT being preferred. The methylation reaction conditions can be varied. However for convenience and optimum yields suitable conditions include the use of temperatures between about 10° C and about 70° C and reaction times sufficient to complete the reaction, usually from about 1 to about 24 hours. In a preferred aspect, the methylation reaction is effected at room temperature. Suitable methylating agents include methyl halides, such as methyl bromide and methyl iodide, dimethyl sulfate, and methyl tosylate.

In a further process aspect of this invention, the novel compounds of formula I wherein the $R_2$ substituent is a lower alkyl group containing from 2 to 7 carbon atoms may be prepared following procedures analogous to those employed in the preparation of myxin. For example, these compounds can be prepared by the selective alkylation of the mono alkali metal salt of iodinin. This alkylation procedure is conducted as described above for the methylation of iodinin. Suitable alkylating agents for this purpose include dialkyl sulfates, such as diethyl sulfate, lower alkyl halides, such as ethyl bromide, 1-bromo butane and the like, and lower alkyl tosylates.

In another process aspect of the present invention, the novel compounds of formula I above wherein the $R_2$ substituent is the group

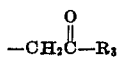

and $R_3$ signifies lower alkoxy can also be prepared following alkylation techniques similar to those described above. Thus, this alkylation procedure, which results in the preparation of ester derivatives, is also preferably carried out in two stages. In the first stage the mono alkali metal salt of iodinin is prepared as described above. In the second stage, this iodinin salt is selectively alkylated by reacting it with the corresponding α-halo ester. Suitable α-halo esters for this purpose include ethyl bromacetate, ethyl α-bromopropionate, ethyl α-bromo-butyrate and the like. As indicated above, this selective alkylation of the mono alkali metal salt of iodinin is expediently effected in the presence of an aprotic polar organic solvent, such as HMPT, DMF and DMSO, with HMPT being preferred. The alkylation reaction conditions can be varied. However, again for convenience and optimum yields, suitable conditions include the use of temperatures from about 10° C to about 70° C, with room temperature being preferred, and reaction times sufficient to complete the reaction, usually 1 to 24 hours.

In a further process aspect of the present invention the novel compounds of formula I above wherein the $R_2$ substituent is the group

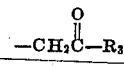

and $R_3$ signifies an amino group or a primary or secondary amino group may be prepared by treating the ester derivative, that is the corresponding compound wherein $R_3$ signifies lower alkoxy, with ammonia or the corresponding primary or secondary amine. Representative amines that may be used in this process aspect include monomethylamine, diethylamine, ethanolamine, 3-dimethylamino-propylamine, and the like. Temperature and reaction time are not critical to this process aspect. Thus, temperatures between about 10° C and about 70° C are suitable, with room temperature being preferred. Likewise, reaction times which permit completion of the reaction are employed, usually from about 1 to about 24 hours.

The novel compounds of formula I have been found to possess broad spectrum antimicrobial activity. In particular, these compounds have demonstrated a high level of activity against a wide variety of bacteria, yeast and fungi such as *Streptococcus agalactiae*, *Staphylococcus aureus*, *Escherichia coli*, *Pseudomonas aeruginosa*, *Moraxella bovis*, *Candida albicans*, and *Microsporum canis*. The novel compounds of this invention are particularly useful in the treatment of animal diseases of microbial origin. When the novel compounds of formula I are employed in the treatment of microbial infections, they are conveniently utilized in combination with suitable pharmaceutical carrier materials. These compositions are formulated by uniformly distributing the compound of formula I throughout a vehicle that is chemically compatible with the particular compound, non-inhibiting with respect to the active ingredients and essentially non-injurious to the body tissue under the conditions of use. When formulated into compositions suitable for topical administration, the novel compounds of this invention are preferably employed in amounts ranging from about 0.05 percent to about 1.0 percent by weight of the composition. The compounds of this invention, when employed in forms suitable for topical administration, may be utilized in varied formulations; for example, in solid formulations including finely divided powders and granular materials and liquid formulations including suspensions, concentrations, tinctures, slurries, aerosols, and the like. Further, they may be employed as creams, gels, jellies, ointments, pastes, etc.

The following examples further illustrate the scope of the invention. All temperatures given are in degrees centigrade unless indicated otherwise.

EXAMPLE 1

Preparation of 1-hydroxy-6-methoxyphenazine 5,10-dioxide (myxin)

1.30 grams of potassium t-butoxide (0.0116 m) was added with stirring to 2.44 grams of iodinin (0.01 m) suspended in 150 ml. of hexamethylphosphoric triamide (HMPT). The mixture was stirred at room temperature overnight. 1.4 ml. dimethyl sulfate (0.015 m) was added to the resulting emerald solution and stirring was continued. After another three hours, the reaction mixture was poured into 1,000 ml. ice water. The aqueous mixture was extracted with 3 × 500 ml. ethyl acetate. The organic extracts were washed with 2 × 300 ml. water. The water washings were reextracted with 2 × 250 ml. benzene. The organic phases were combined, dried over anhydrous magnesium sulfate, filtered and evaporated in vacuum. The residue was dissolved in 200 ml. methylene chloride. The resulting solution was filtered through a sintered glass funnel. The filtrate was applied to a chromatography column prepared from 100 grams silica gel slurried in methylene chloride. The column was developed with a mixture of methylene chloride and ethyl acetate (2:1). The fractions containing pure myxin were combined and evaporated in vacuum. The residue was redissolved in 100 ml. boiling methylene chloride. The solution was diluted with 150 ml. hot acetone. On cooling 1.781 grams of 1-hydroxy-6-methoxyphenazine 5,10-dioxide crystallized giving a yield of 69 percent based on the iodinin.

EXAMPLE 2

Preparation of 6-Methoxy-2-pyrrolidinylmethyl-1-phenazinol 5,10-dioxide 2.58 grams of myxin, 25 ml. of hexamethyl phosphoric triamide (HMPT), 1 ml. of formalin and 1 ml. of pyrrolidine were placed in a flask and stirred at room temperature for 24 hours. The reaction mixture was diluted with 400 ml. of CHCl₃ and extracted repeatedly with 10 per cent aqueous HCl. The combined acid extracts were washed with CHCl₃. The acid extracts were made basic with Na₂CO₃. The basic phase was then extracted with ethyl acetate. The ethyl acetate extract was washed with water dried over Na₂SO₄ and evaporated. The residue was recrystallized from acetone to give the above named product as red crystals, mp 122° (dec.).

EXAMPLE 3

Preparation of 2-Bromo-6-methoxy-1-phenazinol 5,10-dioxide

To 2.58 g of myxin in 500 ml. of chloroform was added dropwise over a 30 minute period a solution of 1.6 g. of bromine in 50 ml. of chloroform. The mixture was stirred for another 30 minutes and then filtered. The filtrate was washed with 5 percent sodium bicarbonate and water, dried over sodium sulfate, filtered and evaporated. The residue was dissolved in dichloromethane and chromatographed on silica gel. Fractions containing the desired product were collected and evaporated in vacuo. The residue was crystallized from chloroform/ether to yield pure material, mp 134° (dec.).

EXAMPLE 4

Preparation of 6-hydroxy-1-phenazinoxyacetic acid 5,10-dioxide ethyl ester 7.32 grams of iodinin, 450 ml. of hexamethyl phosphoric triamide (HMPT) and 3.9 grams of potassium tertiary butyl alcoholate were placed in a flask. The reaction mixture was stirred at room temperature for 16 hours and then 6.0 ml. of ethyl bromo acetate was added. The stirring was continued at room temperature for 3 hours. The reaction mixture was poured into 2.0 liters of ice water and extracted with 3 × 500 ml. of ethyl acetate. The combined ethyl acetate extracts were washed with 500 ml. of water and filtered through a sintered glass funnel. The combined ethyl acetate extracts were dried over magnesium sulfate and concentrated in vacuo. The residue was dissolved in CH₂Cl₂ and chromatographed over 250 grams of silica gel to yield 6-hydroxy-1-phenazinoxyacetic acid, 5,10-dioxide ethyl ester, mp 152° (dec.).

EXAMPLE 5

Preparation of 7-Bromo-6-hydroxy-1-phenazinoxyacetic acid, 5,10-dioxide ethyl ester To a solution of 3.3 g. of 6-hydroxy-1-phenazinoxyacetic acid 5,10-dioxide ethyl ester in 500 ml. of chloroform was added dropwise over a 30 minute period a solution of 1.6 g. of bromine in 50 ml. chloroform. The mixture was stirred at room temperature for 24 hours. It was then filtered. The filtrate was washed with 5 percent aqueous NaHCO₃ and water. After drying over magnesium sulfate it was evaporated to dryness in vacuo. The crystalline residue was slurried in ether and filtered to yield the above named product, mp 132°.

EXAMPLE 6

Preparation of 7-Bromo-6-hydroxy-N-(2-hydroxyethyl)-1-phenazinoxy-acetamide 5,10-dioxide 1 g. of 7-bromo-6-hydroxy-1-phenazinoxyacetic acid 5,10-dioxide ethyl ester in 20 ml. of ethanolamine was stirred at room temperature for 1 hour. The reaction mixture was then diluted with chloroform, washed with dilute HCl, NaHCO₃ and water. The chloroform solution was then dried over sodium sulfate and evaporated. The residue was slurried in ether and filtered giving the above named product, mp 160°.

We claim:

1. A compound selected from the group of compounds of the formula

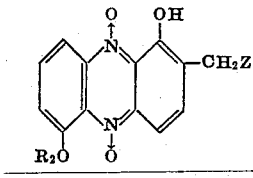

wherein Z signifies a five- or six-membered heterocyclic ring selected from the group consisting of morpholino, piperidino and pyrrolidino and R₂ signifies lower alkyl or the group

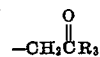

wherein R₃ signifies lower alkoxy, amino, monolower alkylamino, di-lower alkylamino, or hydroxy-lower alkylamino.

2. A compound selected from the group of compounds of the formula:

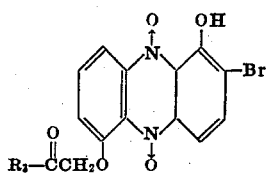

wherein $R_3$ signifies lower alkoxy, amino, mono-lower alkylamino, di-lower alkylamino, or hydroxy-lower alkylamino.

3. The compound of claim 2 wherein $R_3$ is ethoxy, i.e., 7-bromo-6-hydroxy-1-phenazinoxyacetic acid 5,10-dioxide ethyl ester.

4. The compound of claim 2 wherein $R_3$ signifies hydroxy-ethylamino, i.e., 7-bromo-6-hydroxy-N-(2-hydroxyethyl)-1-phenazinoxyacetamide 5,10-dioxide.

5. The compound of claim 1 wherein $-CH_2Z$ signifies 2-pyrrolidinylmethyl and $R_2$ signifies methyl, i.e., 6-methoxy-2-pyrrolidnylmethyl-1-phenazinol 5,10-dioxide.

* * * * *